June 7, 1966    J. A. PELLEGRINI    3,254,700
CONTROL APPARATUS FOR BULK MILK STORAGE
Filed Jan. 3, 1963
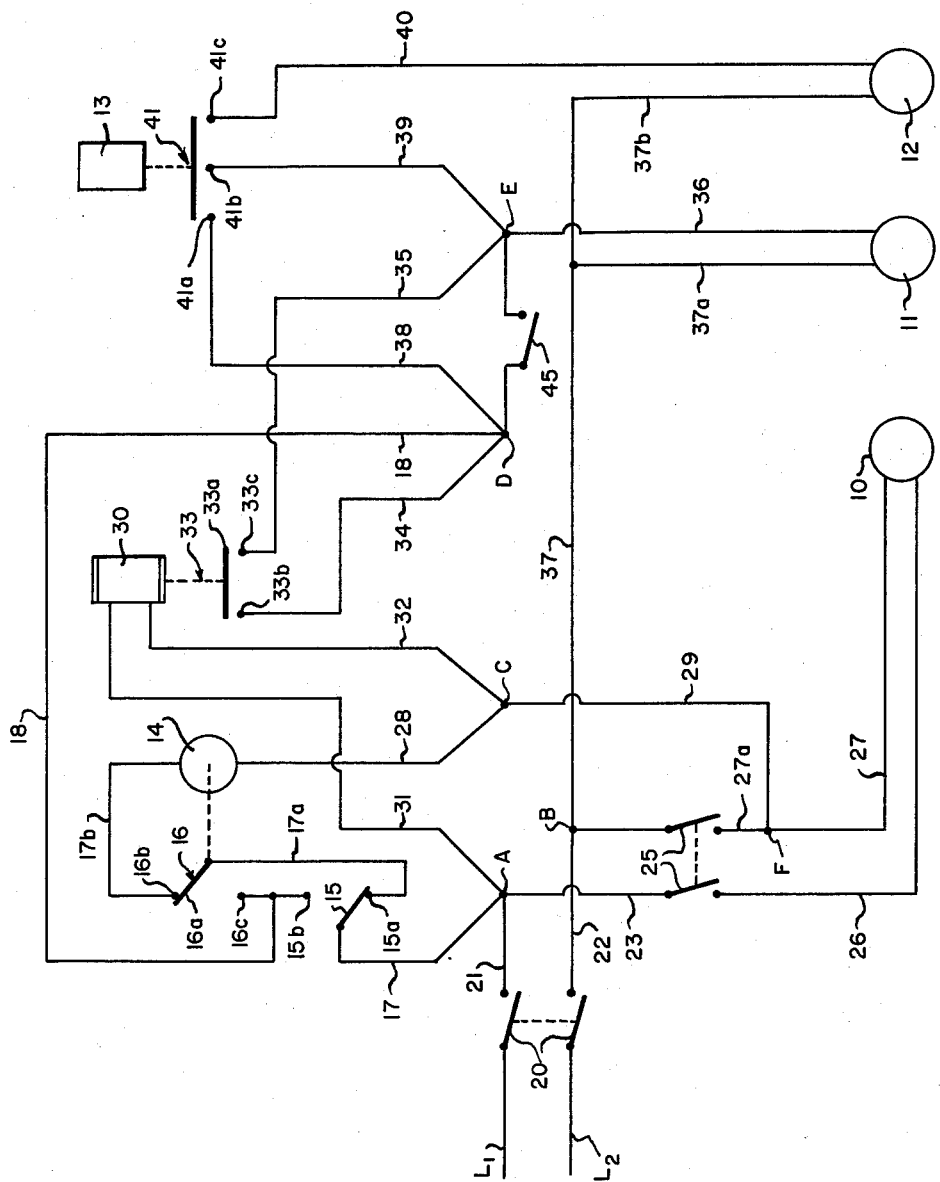
INVENTOR
Joseph A. Pellegrini () # United States Patent Office

3,254,700
Patented June 7, 1966

3,254,700
CONTROL APPARATUS FOR BULK MILK STORAGE
Joseph A. Pellegrini, 310 Bothwell St., Pittsburgh, Pa.
Filed Jan. 3, 1963, Ser. No. 249,233
4 Claims. (Cl. 165—12)

This invention relates broadly to control apparatus for bulk milk storage and more particularly to improvements in control apparatus for controlling operation of milking apparatus and milk storage apparatus.

A serious problem in the dairy industry is the frequency of occasions when a dairy will have to dump a tank truck load of milk because the milk is spoiled. One of the principal ceauses for this spoilage is that a dairy farmer will forget to turn his cooler on and at least the first milking will go overnight without being properly refrigerated. Unless the farmer dumps such milk immediately, the farmer is taking a chance that the milk has not spoiled. Unfortunately, many farmers will take this chance and not only often contaminate their own subsequent milkings but also the 15,000 to 20,000 pounds of milk shipped by other producers in the tank truck that picks up his milk to haul it to the dairy. Milk spoilage can also occur in the refrigerated storage tank itself due to stratification of the milk from different milkings. Storage tanks are generally provided with an agitator which will mix the incoming warm milk with the already cooled milk in the tank and thus prevent the milk from stratifying, i.e., prevent the warm milk from collecting in a layer on top of the cold milk and thereafter spoiling from irregular cooling. Thus, if the farmer forgets or otherwise fails to turn on the agitator when warm milk is entering the tank, spoilage may occur.

My new and improved control apparatus for operating milking and milk storing apparatus overcomes these dangers by eliminating the necessity of relying on the farmer's memory to operate the apparatus properly.

I provide control apparatus for controlling the operation of milking apparatus having a vacuum pump and milk storage apparatus having a refrigerator, an agitator and a thermostat, including a timer actuated to time out by the energizing of the vacuum pump, said timer having a contact that is normally open but which is closed by the timing out of the timer. I further provide a relay switch activated by the energizing and de-energizing of the vacuum pump means. The relay switch has a contact that is closed when the vacuum pump is energized and opened when the vacuum pump is de-energized. In my control apparatus the agitator is energized by the closing of the relay switch and timer contacts, so that the agitator is activated when the vacuum pump is turned on and the timer has timed out. The thermostat is, of course, responsive to the temperature of the milk, if any, in the storage tank and is also responsive to the timer in that the circuit to the thermostat is energized by the closing of the timer contact. The thermostat has a contact of course that is set to close whenever the temperature of the milk rises above the thermostat setting and to open whenever said temperature drop below the thermostat setting. The refrigerator is correspondingly activated by the closing of the thermostat contact and deactivated by the opening of the thermostat contact. The agitator is also activated by the closing of the thermostat contact. Thus, the agitator is activated when the refrigerator is activated as well as when the vacuum pump is activated and the timer has timed out and is deactivated only when both said vacuum pump and refrigerator are deactivated.

Thus, whenever the farmer turns on his vacuum pump for his first milking, my control apparatus takes over and properly controls refrigeration and agitation of the milk from the first milking through the last and until the hauler removes the milk from the bulk tank to take it to the dairy.

Preferably, I provide a timer that is manually adjustable for preselecting the length of its timing-out period. This permits the farmer time at the beginning of his first milking to clean out his system by pumping detergent or disinfectant therethrough without refrigerating and agitating at the same time. The timer is therefor set to time out according to the time it takes the particular farmer to prepare for his first milking. Accordingly, when the farmer actually starts his first milking, the timer will have timed out or will be very close to timing out whereby all is in readiness for proper storage of the milk.

I further preferably provide electrical circuitry that bypasses said timer means and has therein a manually operated switch with a normally open contact. This provides a safety feature in the event the timer mechanism should fail whereby the farmer can actuate the system simply by operating the switch to close the bypass contact.

I also preferably include electrical circuitry bypassing the relay switch and the thermostat contacts and which has therein a manually operated switch with a normally open contact whereby the agitator can be operated independently of the vacuum pump and referigerator. This permits independent operation of the agitator for sample taking of the milk by the hauler when he comes to pick up the milk.

Other details, objects and advantages of the invention will become apparent as the following description of a present preferred embodiment thereof proceeds.

In the accompanying drawing I have shown a present preferred embodiment in a schematic diagram of my control apparatus in combination with milking apparatus having vacuum pump means and milk storage apparatus having refrigerator means, agitator means and temperature responsive means.

Referring now to the drawing, I there illustrate diagrammatically milking apparatus having a vacuum pump 10, and bulk milk storage apparatus having an agitator 11, refrigerator 12, and thermostat 13. These above enumerated elements are standard items well known to and generally used by those skilled in this art and this invention is directed primarily to control apparatus for operating these items. As earlier explained, it has heretofore been necessary for the farmer to remember to turn on the refrigerator and to turn on the agitator with the possibility of the farmer's forgetting to do so and thereby spoiling the milk. My control apparatus eliminates this possibility and a detailed description with reference to the drawing follows.

Power source lines (designated $L_1$ and $L_2$) lead to a master switch 20 which is normally closed. Master switch 20 is connected to a terminal A by line 21 and to a terminal B by line 22. Terminal A is connected to a vacuum pump switch 25 by line 23 and terminal B is connected to vacuum pump switch 25 by line 24. Vacuum pump switch 25 is connected to vacuum pump 10 by lines 26 and 27. It can be understood from the foregoing that by operating vacuum pump switch 25 to close the circuit just described, vacuum pump 10 will be energized.

Terminal A is also connected to timer 14 through switches 15 and 16 by the lines designated 17—17a–17b. Timer 14 is connected to a terminal C by line 28 which in turn is connected by line 29 to line 27 at terminal F located on line 27 intermediate vacuum pump switch 25 and vacuum pump 10. It can thus be understood that the closing of switch 25 not only energizes vacuum pump 10 but also energizes timer 14. Timer 14, which as earlier explained is manually set for a preselected timing-out period, will commence to time out upon being so energized. At the completion of the timing-out period, timer 14 moves its contact arm 16a from contact point 16b to contact point 16c, generally referred to hereinafter as timer contact 16. Contact point 16c is connected to a terminal D by line 18. Terminal D is thus connected to terminal A by the timing out of timer 14, and the circuit to timer 14 is thereby opened.

Terminal A is further connected to a relay switch 30 by line 31. Relay switch 30 is connected by line 32 to terminal C which, as earlier described, is connected to terminal F. Thus, when vacuum pump switch 25 is closed, the circuit to relay switch 30 is closed and relay switch 30 energized to move its contact arm 33a to connect contact point 33b to contact point 33c, generally hereinafter referred to as relay switch contact 33. Contact 33b is connected to terminal D by line 34 and contact 33c is connected to terminal E by line 35, whereby terminals D and E are connected by the closing of relay contact 33 when vacuum pump switch 25 is closed. Since agitator 11 is connected to terminal E (by line 36) and terminal B (by lines 37–37a), it is energized when vacuum pump 10 is energized and timer 14 has timed out.

Terminals D and E are further connected to thermostat 13 by lines 38 and 39 respectively. Thermostat 13 is also connected to refrigerator 12 by line 40. Thermostat 13 has a contact arm 41 which is, of course, activated in the well known manner by the temperature of the milk being stored. When additional cooling is called for, contact arm 41 moves to connect contact points 41a, 41b, and 41c.

It will be understood therefore that agitator 11 will also be energized when thermostat 13 connects contact 41a with contact 41b provided, of course, timer 14 has timed out to energize terminal D. And that refrigerator 12 will be energized only when thermostat 13 connects contact 41a with contact 41c after timer 14 has timed out.

From the foregoing, it should be clear that normal operation with my control apparatus will be as follows: The farmer enters his barn and preparatory to conducting his first milking turns on vacuum pump 10 by manually closing switch 25 (master switch 20 already being in its normally closed position) and proceeds to clean his milk lines and so forth in preparation for the first milking. The closing of switch 25 energizes relay switch 30 to close relay contact 33 and also energizes timer 14 to commence timing out. Timer 14 times out according to the period for which it was preset (usually on the order of 15 minutes) while the farmer is making his preparations.

When timer 14 times out, the farmer has finished or nearly finished his preparations and warm milk is now beginning to enter or is about to enter the bulk milk storage tank.

When timer 14 timed out, it closed its contact with contact point 16c which energized terminal D and also terminal E through relay contact 33 to thus start agitator 11 running. Furthermore, since this is the first milking and the storage tank has not been refrigerated, thermostat 13 is calling for refrigeration and thus its contact arm 41 is closed with contacts 41a, 41b and 41c so that refrigerator 12 also commences to run to refrigerate the storage tank.

Tracing through the circuitry of my apparatus, $L_1$ is the line bringing the power to the apparatus and $L_2$ is the return line. When the farmer closes vacuum pump switch 25, the current flows from $L_1$, through normally closed master switch 20 and line 21 to terminal A, thence through line 23, switch 25, line 26 to vacuum pump 10 and returns through line 27–27a, switch 25, line 24, terminal B, line 22 and master switch 20 to $L_2$, thus activating vacuum pump 10.

Current also flows from terminal A through line 31 to relay 30 and returns through line 32, terminal C, line 29, terminal F, line 27a, switch 25, line 24 to terminal B and thence to $L_2$, thus activating relay 30 to close relay contact 33.

Current also flows from terminal A through line 17, switch 15, line 17a, switch 16 and line 17b to timer 14 and returns through line 28 to terminal C and thence to $L_2$ as earlier described. Thus, timer 14 is activated to start timing out.

Upon timing out, timer 14 switches contact arm 16 from making contact with contact point 16b to making contact with contact point 16c. This de-energizes the circuit to timer 14 but energizes other circuitry as follows: From terminal A, the current flows through line 17, switch 15, line 17a, through switch 16 to line 18 and thence to terminal D. From terminal D, current flows through line 34, relay contact 33 (now closed as earlier described), line 35, terminal E, line 36 to agitator 11 and returns through lines 37a–37 to terminal B and thence to $L_2$. Current also flows from terminal D through line 38, thermostat contact arm 41 (thermostat contact 41 being closed as earlier explained), line 39, terminal E and line 36 to agitator 11 and returns to $L_2$ as just described above with respect to agitator 11. Thus, agitator 11 is activated by two sources, one through relay contact 33 and one through thermostat contact 41.

In addition, current flows from terminal D through line 38 and thermostat contact arm 41 to line 40 which leads to refrigerator 12 and returns through line 37b–37 to terminal B and thence $L_2$, whereby refrigerator 12 is activated.

Returning now to the sequence of the milking operation, the farmer has just completed the first milking and he then opens vacuum pump switch 25 to shut down vacuum pump 10. The opening of switch 25 also de-energizes relay 30 which opens relay contact 33, whereby agitator 11 now runs solely through the dictates of thermostat 13. Thus, between milkings, agitator 11 will be activated only when thermostat 13 calls for refrigeration. Similarly, between milkings agitator 11 and refrigerator 12 will be simultaneously deactivated when thermostat 13 ceases calling for refrigeration.

When the farmer returns for the second milking, he closes vacuum pump switch 25 and prepares for the milking. Since timer 14 is already timed out from the first milking, agitator 11 will immediately commence agitating the milk from the first milking, whether thermostat 13 calls for refrigeration and agitation or not. The advantage of this is that the milk already in the storage tank will be of an evenly cooled temperature and circulating when the warm milk from the second milking starts coming in. Of course, during preparation for the first milking, the farmer does not want the agitator and refrigerator running lest he freeze up the system in the absence of warm milk in the storage tank and this is the principal reason for timer 14 which prevents this from happening. Subsequent thereto, however, it is necessary to have the refrigerator and agitator operating at all times in accordance with the demands of the thermostat and it is further advantageous to have the agitator running during subsequent milkings, even though thermostat 13 is not calling for it, to prevent milk spoilage due to milk stratification as explained earlier.

During the second milking, it is understandable that when the warm milk entering the storage tank is mixed by the agitator with the refrigerated milk from the first milking, it will do two things. First, it will cool the warm milk faster which is very beneficial, and second, it will warm the milk from the first milking so that thermostat 13 will more certainly call for additional refrigeration, which otherwise might not occur if the agitator had not been running and the milk been allowed to stratify into a warm layer on top of a cold layer.

After the second milking is over, the farmer opens switch 25 and shuts down vacuum pump 10 and thereby also opens relay contact 33 as earlier described whereby refrigerator 12 and agitator 11 operate solely via thermostat 13 as before.

The operation for all subsequent milkings is the same as just described for the second milking.

Ultimately, the hauler comes to empty the storage tank and haul the milk away. Usually this occurs after four milkings. As a part of the hauler's routine, it is necessary that he take test samples of the milk and he must agitate the milk prior to drawing his samples so that the samples are representative of all the milk in the storage tank. For this purpose, I provide a manual bypass switch 45 which connects terminals D and E directly, bypassing both relay contact 33 and thermostat contact arm 41. Thus, inasmuch as timer 14 has long since timed out when the hauler arrives, the hauler can activate agitator 11 for his test specimens simply by closing switch 45.

While the hauler is removing the milk from the storage tank, he will, as a part of his routine, also set the timer for the farmer in accordance with the time the farmer has specified it takes him to prepare for the first milking.

Timer 14 is set manually by turning a dial and this physical action further moves contact arm 16 from contacting contact 16c to contacting 16b, thus breaking the circuit to terminal D and setting up the circuit to timer 14. Of course, the farmer can do this for himself, but preferably, the hauler should do it and the farmer check that it has been done and that way two people are responsible and the likelihood of both forgetting to set the timer minimized. Furthermore, even in the unlikely event that both should forget to reset the timer, they will immediately realize their lapse when the refrigerator and agitator commence running when the milk is removed from the storage tank, as the removal of the cold milk will cause the thermostat to call for refrigeration and agitation and set them running unless or until the timer is reset.

I also provide, as a safety feature, a manual switch 15 which bypasses timer 14. Thus, if somehow timer 14 fails to function properly, the farmer can manually switch the contact arm of switch 15 from contacting contact 15a to contacting contact 15b and bypass timer 14 whereby the system will operate just as if timer 14 had timed out. Preferably, switch 15 is a two position switch (i.e., no "off" position) so that its contact arm is always contacting one or the other of contacts 15a and 15b.

Master switch 20 is a manual switch and, of course, is normally closed, but nevertheless is available to shut down the entire system for maintenance purposes if necessary.

It is clear from the foregoing, that my control apparatus normally permits automatic operation throughout the entire milking cycle. The only thing the farmer has to do is close vacuum pump switch 25, which he must do to operate and therefore cannot forget. Thus, reliance upon the farmer's memory is eliminated and the danger of milk spoilage with it.

While I have shown and described a present preferred embodiment of the invention, it is to be distinctly understood that the invention is not limited thereto but may be otherwise variously embodied within the scope of the following claims.

I claim:

1. In electrical control apparatus for controlling the operation of milking apparatus having vacuum pump means and milk storage apparatus having refrigerator means, agitator means and temperature responsive means, the improvement comprising, in combination, timer means responsive to the energizing of the vacuum pump means, said timer means having a normally open contact which closes upon the timer out of said timer means, relay switch means responsive to the energizing and de-energizing of said vacuum pump means, said relay switch means having a contact which accordingly is closed when said vacuum pump means is energized and opened when said vacuum pump is de-energized, said agitator means being energized by the closing of said relay switch and timer contacts, said temperature responsive means being also responsive to said timer means in that the electrical circuit to said temperature responsive means is energized by the closing of the timer contact, said refrigerator means and agitator means being responsive to said temperature responsive means whereby said refrigerator means is energized and de-energized only through said temperature responsive means and said agitator means is energized when said refrigerator means is energized and also when said vacuum pump means is energized and said timer means has timed out and is de-energized only when both said vacuum pump means and refrigerator means are de-energized.

2. The improvement in electrical control apparatus for controlling the operation of milking apparatus and milk storage apparatus as claimed in claim 1 wherein said timer means is manually selectively adjustable for preselecting the length of its timing-out period.

3. The improvement in electrical control apparatus for controlling the operation of milking apparatus and milk storage apparatus as claimed in claim 1 including electrical circuitry bypassing said timer means and having therein a manually operable switch with a normally open contact wherein by manually operating said switch to close said contact said milk storage apparatus may be operated without said timer means.

4. The improvement in electrical control apparatus for controlling the operation of milking apparatus and milk storage apparatus as claimed in claim 1 including electrical circuitry bypassing said relay switch means and said temperature responsive means and having therein a manually operated switch with a normally open contact wherein by manually operating said switch to close said contact said agitator may be energized without energizing either of the vacuum pump means and the refrigerator means.

References Cited by the Examiner

UNITED STATES PATENTS

| | | | |
|---|---|---|---|
| 2,161,847 | 6/1939 | Blodgett | 165—12 |
| 2,735,659 | 2/1956 | Estes | 165—12 |
| 2,994,212 | 8/1961 | Crowther | 165—109 |
| 3,035,543 | 5/1962 | Duncan et al. | 119—14.09 |

FREDERICK L. MATTESON, JR., *Primary Examiner.*

CHARLES SUKALO, *Examiner.*